United States Patent
Kudo et al.

[11] Patent Number: 5,836,822
[45] Date of Patent: Nov. 17, 1998

[54] CONSTANT VELOCITY UNIVERSAL JOINT

[75] Inventors: Satoru Kudo; Shouichi Nakao; Takeshi Kayano; Tsutomu Kawakatsu; Atsushi Nagaoka, all of Mooka, Japan

[73] Assignee: Honda Giken Kogyo Kabushiki Kaisha, Tokyo, Japan

[21] Appl. No.: 791,559

[22] Filed: Jan. 31, 1997

[30] Foreign Application Priority Data

Feb. 1, 1996 [JP] Japan ................................. 8-016920

[51] Int. Cl.⁶ ........................................................ F16D 3/205
[52] U.S. Cl. ............................ 464/111; 464/132; 464/905
[58] Field of Search ..................................... 464/111, 120, 464/123, 132, 905

[56] References Cited

U.S. PATENT DOCUMENTS

| | | | |
|---|---|---|---|
| 4,279,706 | 7/1981 | Otsuka et al. | 464/132 X |
| 4,891,035 | 1/1990 | Sasaki et al. | 464/905 X |
| 5,330,389 | 7/1994 | Jost et al. | 464/905 X |
| 5,380,249 | 1/1995 | Krude | 464/111 |
| 5,507,693 | 4/1996 | Schwarzler et al. | 464/111 |
| 5,525,109 | 6/1996 | Hofmann et al. | 464/111 |

FOREIGN PATENT DOCUMENTS

| | | |
|---|---|---|
| 0441382A1 | 8/1991 | European Pat. Off. . |
| 2668804A1 | 5/1992 | France . |
| 4301207C1 | 6/1994 | Germany . |
| A4-282028 | 10/1992 | Japan . |
| A6-123316 | 5/1994 | Japan . |
| 2259557 | 3/1993 | United Kingdom . |
| 2268789 | 1/1994 | United Kingdom ............... 464/111 |

Primary Examiner—Eileen A. Dunn
Attorney, Agent, or Firm—Birch, Stewart, Kolasch & Birch, LLP

[57] ABSTRACT

A constant velocity universal joint having a guide groove with a plane section and a rolling surface, an outer roller having an outer circumferential surface formed to have a linear cross section corresponding to the rolling surface and being displaceable along the rolling surface, a holder having an upper end formed to be capable of abutting against or being separated from the plane section, an expanded section having a curved and/or flat configuration and protruding toward a trunnion, and a curved section for making point-to-point contact with the expanded section.

10 Claims, 5 Drawing Sheets

CONSTANT VELOCITY UNIVERSAL JOINT

BACKGROUND OF THE INVENTION

1. Field of the Invention:

The present invention relates to a constant velocity universal joint for coupling a driving shaft and a driven shaft, to be used, for example, for a driving force-transmitting section of an automobile.

2. Description of the Related Art:

A constant velocity universal joint has been hitherto used for a driving force-transmitting section of an automobile in order to transmit a rotary driving force or torque of a driving shaft to respective axles through a driven shaft.

Such a conventional constant velocity universal joint is based on a technical concept disclosed in Japanese Laid-Open Patent Publication No. 6-123316. A system is adopted in Japanese Laid-Open Patent Publication No. 6-123316, in which a contact surface having a sagittal configuration formed on a roller element is allowed to contact with a sagittal running surface formed on a recess of an outer member, and an annular shoulder formed on the roller element or a roller support is allowed to abut against a shoulder surface defined on an indentation. Thus the roller element is prevented from tilting in a track.

Another conventional constant velocity universal joint is based on a technical concept disclosed in Japanese Laid-Open Patent Publication No. 4-282028. A system is adopted in Japanese Laid-Open Patent Publication No. 4-282028, in which a vertical gap is defined inside an outer member. The system includes a rolling body for always contacting with a rolling surface defined in the vertical gap through either a contact point A or a contact point B and a contact point C, and a shoulder for regulating displacement of the rolling body.

However, the conventional constant velocity universal joints as described above involve the following disadvantages. Namely, the angle of inclination of the roller element is regulated only by the shoulder surface expanding radially inwardly adjacent to the track. Further, the displacement of the rolling body is regulated only by the shoulder. Therefore, it is impossible to sufficiently regulate the angle of inclination of the roller element or the rolling body.

SUMMARY OF THE INVENTION

A general object of the present invention is to provide a constant velocity universal joint which makes it possible to smoothly transmit rotational motion from one transmitting shaft to the other transmitting shaft by regulating the angle of inclination of an outer roller.

A principal object of the present invention is to provide a constant velocity universal joint which makes it possible to sufficiently and highly accurately regulate the angle of inclination of an outer roller by exerting a plurality of functions on the outer roller in a concerted manner.

According to the present invention, when an outer roller is inclined at a predetermined angle with respect to a guide groove, a first function regulates an angle of inclination of the outer roller by means of an upper end of a holder which abuts against a plane section of the guide groove. A second function regulates the angle of inclination of the outer roller by means of frictional resistance generated when the outer roller is slidably displaced along a rolling surface regulates third function to regulates the angle of inclination of the outer roller by means of a curved section of the outer roller which rolls while making point-to-point contact with an expanded section which is exerted respectively in a concerted manner. Thus the angle of inclination of the outer roller with respect to the guide groove is regulated.

In the present invention as described above, the plurality of the functions are exerted on the outer roller in the concerted manner. Thus the angle of inclination of the outer roller with respect to the guide groove can be regulated sufficiently and highly accurately.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
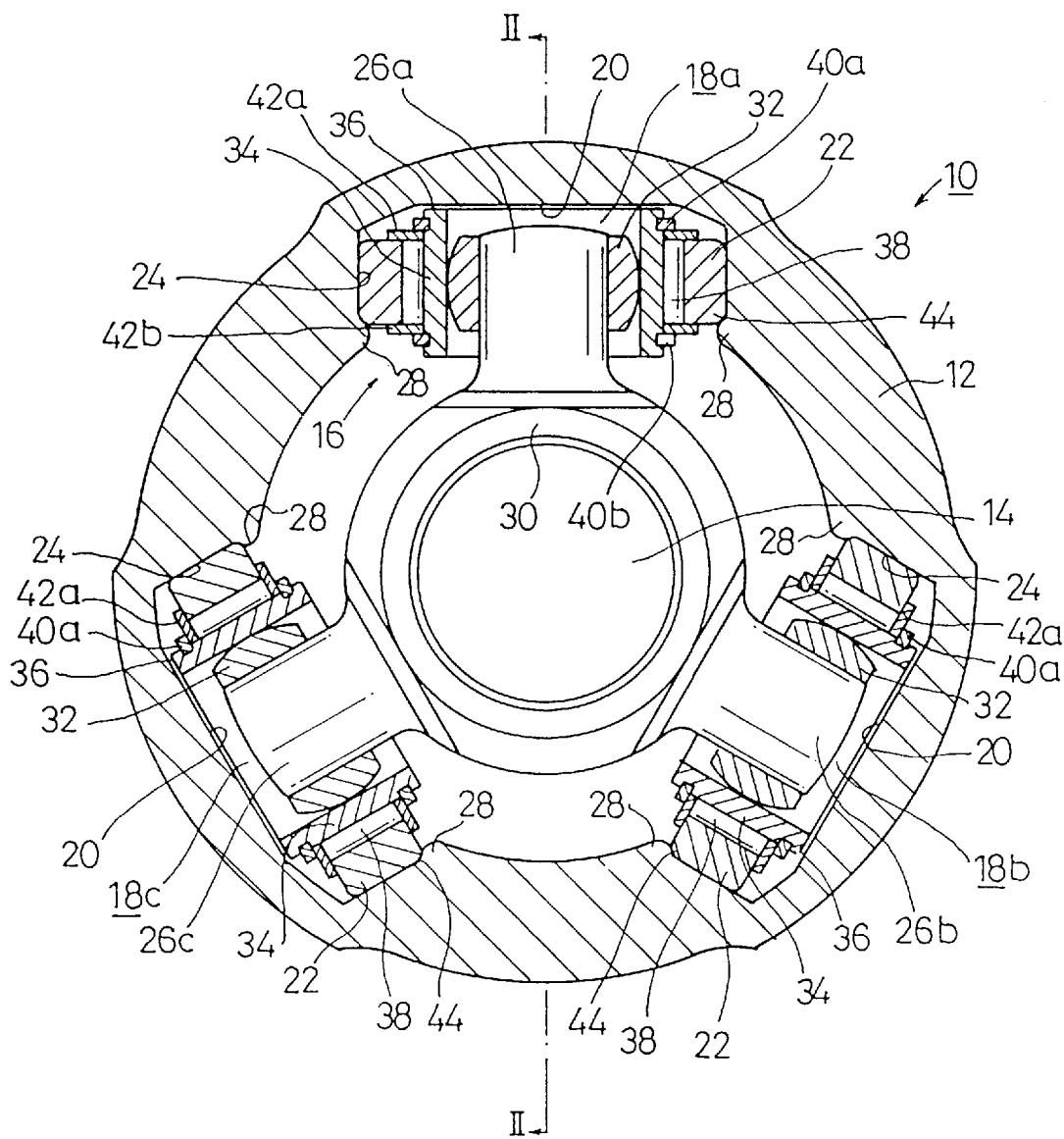
FIG. 1 shows a vertical cross-sectional view illustrating a constant velocity universal joint according to an embodiment of the present invention in a cross section taken along a direction perpendicular to an axis of the constant velocity universal joint.

In FIG. 1, reference numeral 10 indicates a constant velocity universal joint according to an embodiment of the present invention. The constant velocity universal joint 10 basically comprises a cylindrical outer cup (outer member) 12 integrally coupled to one end of an unillustrated driving shaft and having an opening, and an inner member 16 secured to one end of a driven shaft 14 and accommodated in a hole of the outer cup 12.

Three guide grooves 18a to 18c are defined on an inner circumferential surface of the outer cup 12. The guide grooves 18a to 18c extend along an axial direction, and they are spaced apart from each other by an angle of 120 degrees respectively. Each of the guide grooves 18a (18b, 18c) is formed with a plane section (first plane section) 20 formed to be flat, and a plane substantially perpendicular to the plane section 20. The guide groove 18a (18b, 18c) has a rolling surface (second plane section) 24 which contacts with an outer circumferential surface of an outer roller 22 described later on.

An expanded section 28, which protrudes toward a center of a trunnion 26a (26b, 26c) as described later on has a curved and/or flat configuration, is formed at a lower end of the rolling surface 24. The opening of the outer cup 12 is closed by an unillustrated flexible boot.

As shown in FIG. 1, a ring-shaped boss 30 is externally fitted to the driven shaft 14. The three trunnions 26a (26b, 26c), which expand toward the guide grooves 18a (18b, 18c) and are spaced apart from each other by an angle of 120 degrees about the axial center respectively, are integrally formed on an outer circumferential surface of the boss 30. Each of the trunnions 26a (26b, 26c) is formed to expand in a columnar configuration along a direction substantially perpendicular to the axis of the driven shaft 14. A ring-shaped inner roller 32, which has its outer circumferential surface formed to be a spherical surface, is externally fitted to each of the trunnions 26a (26b, 26c).

A cylindrical holder 34 is externally fitted to the inner roller 32. The holder 34 is constructed such that an inner circumferential surface of the holder 34 is formed to have a linear cross section which contacts with the outer circumferential surface of the inner roller 32 which is formed to have a curved cross section. Therefore, the trunnion 26a (26b, 26c) is slidable along an axial direction of the holder 34 by the aid of the inner roller 32, and it is tiltable within a predetermined angle with respect to the holder 34.

Figure 6:
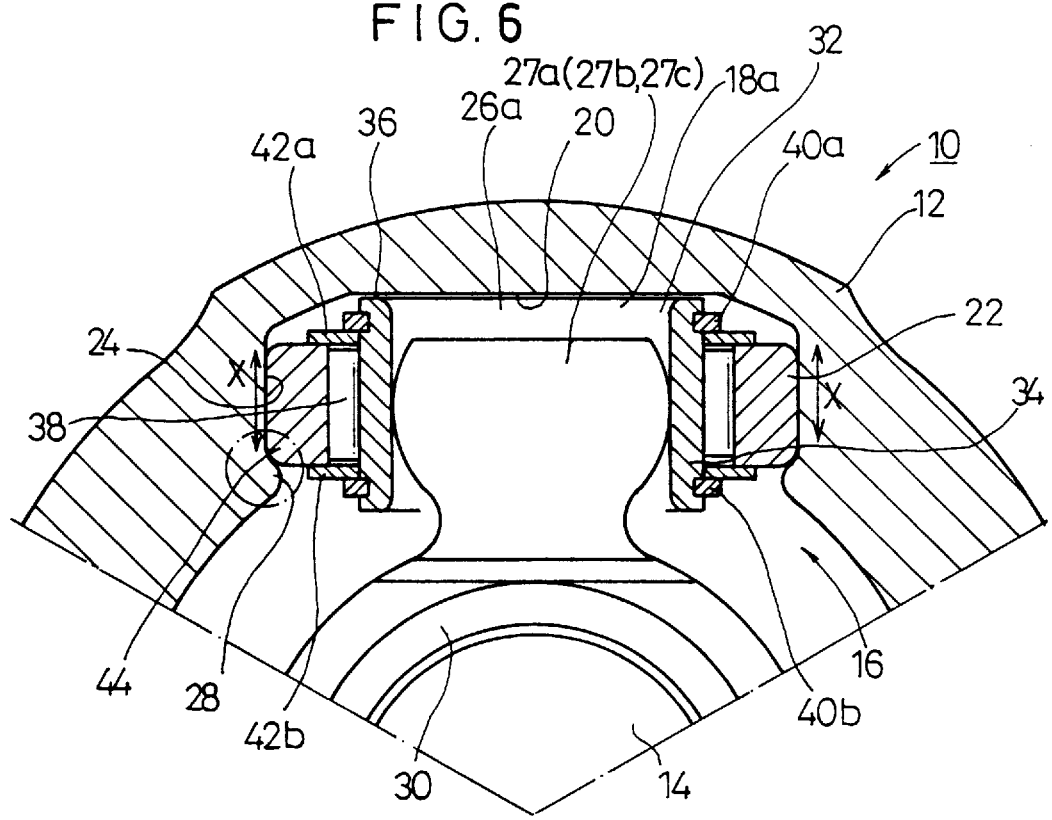
FIG. 6 shows a vertical cross-sectional view illustrating a modified embodiment of a trunnion for constructing the constant velocity universal joint shown in FIG. 1.

In another embodiment as shown in FIG. 6, it is allowable to use a spherical trunnion 27a (27b, 27c) in which the inner roller 32 and the trunnion 26a (26b, 26c) shown in FIG. 1 are combined into one unit (see FIG. 6). In this embodiment, it is unnecessary to provide the inner roller 32. Therefore, an advantage is obtained in that the number of parts is reduced, and the production cost can be decreased.

An upper end 36 of the holder 34 protrudes toward the plane section 20 as compared with an upper end of the inner roller 32 so that the upper end 36 of the holder 34 is capable of abutting against and being separated from the plane section 20 of the guide groove 18a (18b, 18c). Namely, the upper end 36 of the holder 34 is positioned, in an ordinary state, to have a slight clearance with respect to the plane section 20 of the guide groove 18a (18b, 18c). Further, the upper end 36 of the holder 34 is formed to abut against the plane section 20 when the driving shaft or the driven shaft 14 is relatively inclined at a predetermined angle.

The outer roller 22 is externally fitted to an outer circumferential section of the holder 34 through a plurality of needle bearings 38. The outer roller 22 has its outer circumferential surface with a cross section formed to be linear corresponding to the cross-sectional configuration of the guide groove 18a (18b, 18c). The respective needle bearings 38 and the outer roller 22 are held by a set of circlips 40a, 40b and washers 42a, 42b fitted to annular grooves of the holder 34. It is possible to hold the needle bearings 38 and the outer roller 22 only by using the circlips 40a, 40b without using the washers 42a, 42b.

Figure 2:
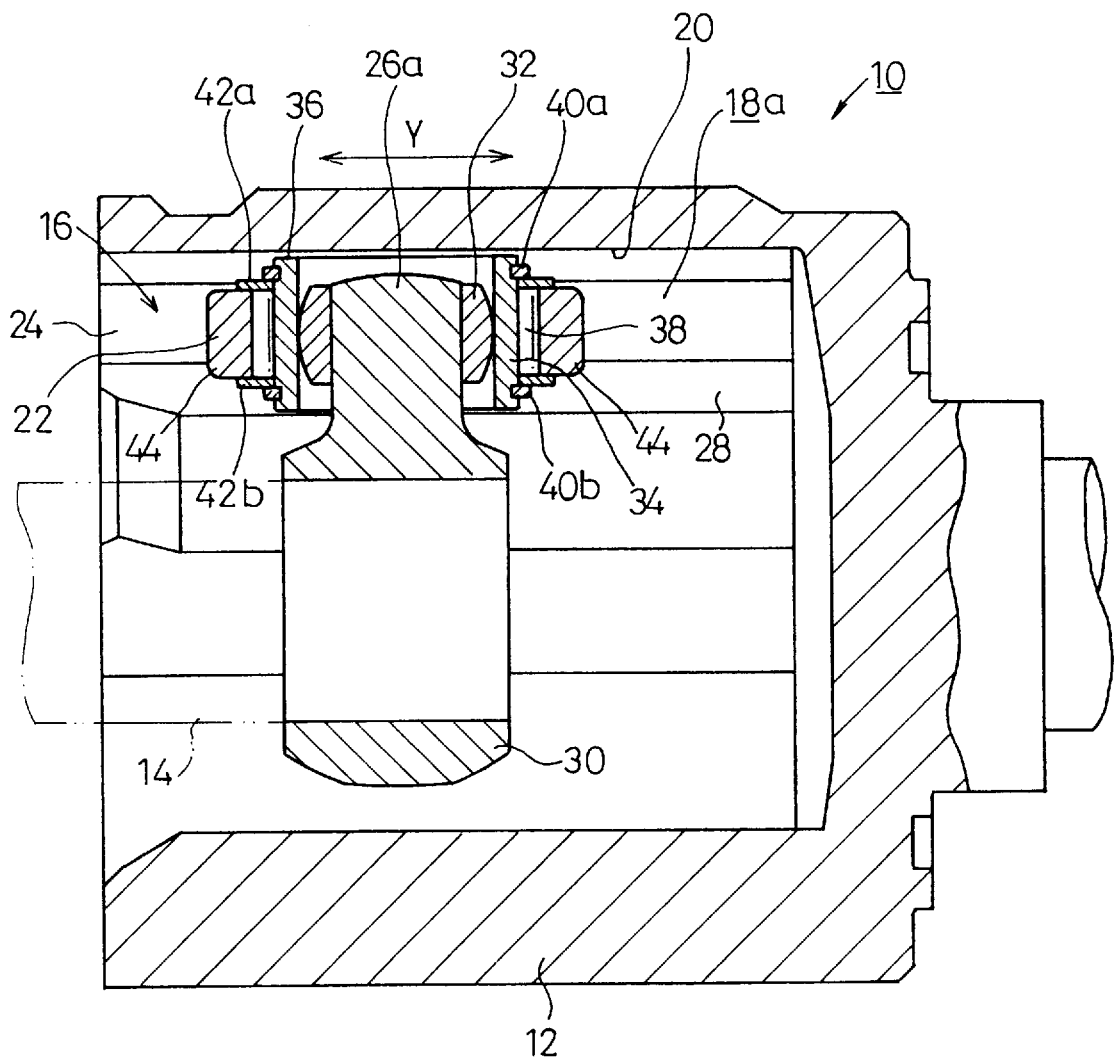
FIG. 2 shows a vertical cross-sectional view taken along a line II—II shown in FIG. 1.
Figure 3:
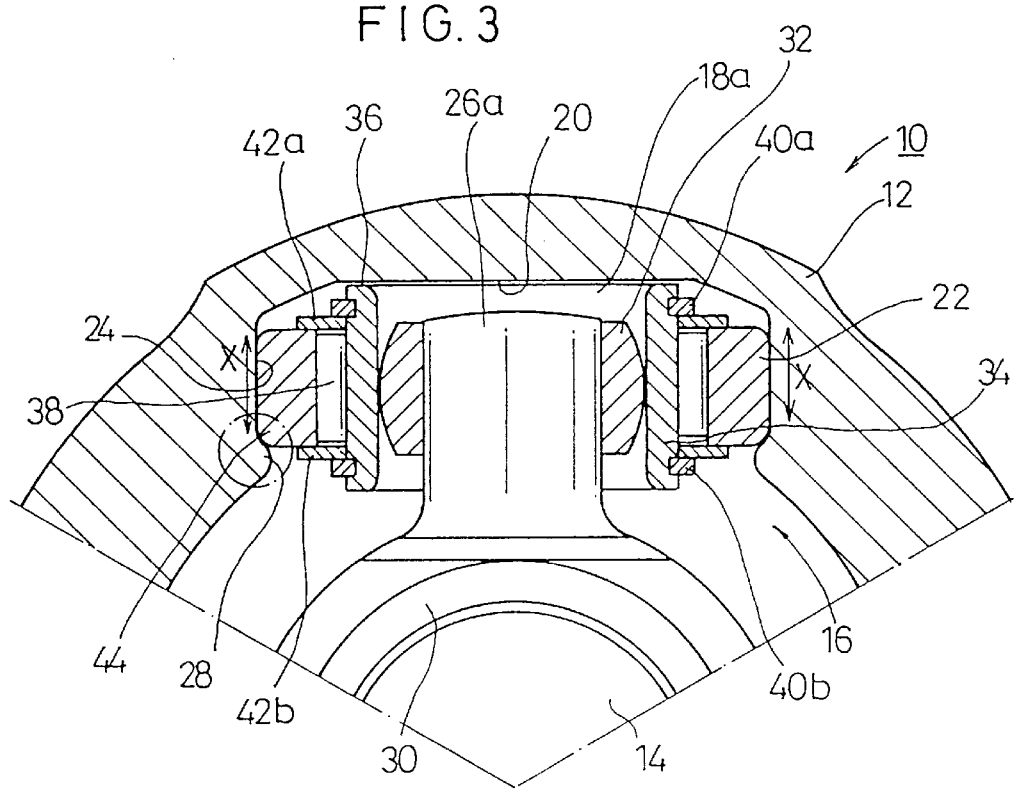
FIG. 3 shows an enlarged view of a part of the constant velocity universal joint shown in FIG. 1.
Figure 4A:
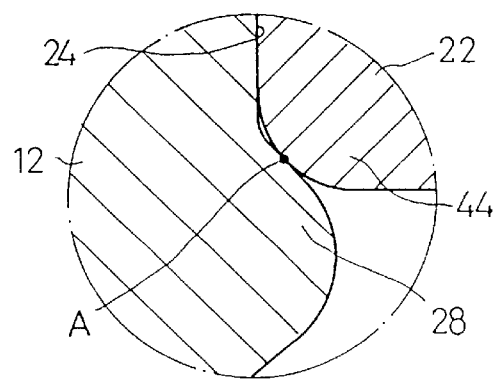
FIG. 4(A) illustrates an enlarged view of a part of the constant velocity universal joint shown in FIG. 3.

The outer circumferential surface of the outer roller 22 makes surface-to-surface contact with the rolling surface 24 of the guide groove 18a (18b, 18c). Thus the outer roller 22 is slidable in its axial direction (in a direction indicated by an arrow X in FIG. 3). Moreover, the outer roller 22 is rollable laterally (in a direction indicated by an arrow Y in FIG. 2) along the rolling surface 24. Further, the outer roller 22 has, at its lower end, a curved section 44 which is formed to have a circular arc-shaped cross section. In an ordinary state, the curved section 44 makes point-to-point contact with the expanded section 28 at a contact point A (see FIG. 4(A).

Figure 4B:
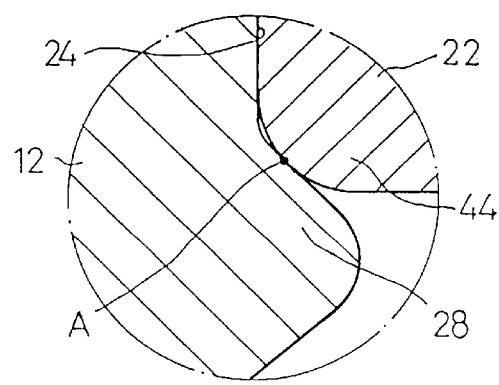
FIG. 4(B) illustrates an enlarged view of a flat portion on the expanded section of a part of the constant velocity universal joint.

Although the expanded section 28 of the outer cup 12 and the curved section 44 of the outer roller 22 may be formed to have the same radius of curvature, a different radius of curvature can be adopted in the expanded section 28 of the outer cup 12 and the curved section 44 of the outer roller. Radii of curvature set as different from each other achieve advantages such that degrees of freedom for designing increase and they are processed easily. Further, where the outer roller 22 has the curved section 44, the, expanded section 28 may adopt a flat shape(see FIG. 4(B). Stated otherwise, the expanded section 28 may adopt the flat shape at the contact point A. Still further, the expanded section 28 may adopt the shape in combination with a flat and a curved one.

The constant velocity universal joint 10 according to the embodiment of the present invention is basically constructed as described above. Now, the operation, function, and effect of the constant velocity universal joint 10 will be explained.

When the unillustrated driving shaft is rotated, its rotary driving force or torque is transmitted to the inner member 16 through the outer cup 12. Accordingly, the driven shaft 14 is rotated in a predetermined direction by the aid of the trunnions 26a to 26c.

Namely, the rotary driving force of the outer cup 12 is transmitted to the outer rollers 22 which are displaceable along the guide grooves 18a (18b, 18c). The force is further transmitted to the holders 34 held by the outer rollers 22 through the needle bearings 38, and the force is transmitted to the trunnions 26a (26b, 26c) through the inner rollers 32. Thus the driven shaft 14, which is engaged with the trunnions 26a (26b, 26c), is rotated.

In this operation, if the unillustrated driving shaft or the driven shaft 14 is inclined, the outer rollers 22 roll along the guide grooves 18a to 18c. Accordingly, the velocity of rotation of the driving shaft is not affected by the angle of inclination of the driven shaft 14 with respect to the outer cup 12, and the force is always transmitted to the driven shaft 14 at a constant velocity of rotation.

Figure 5:
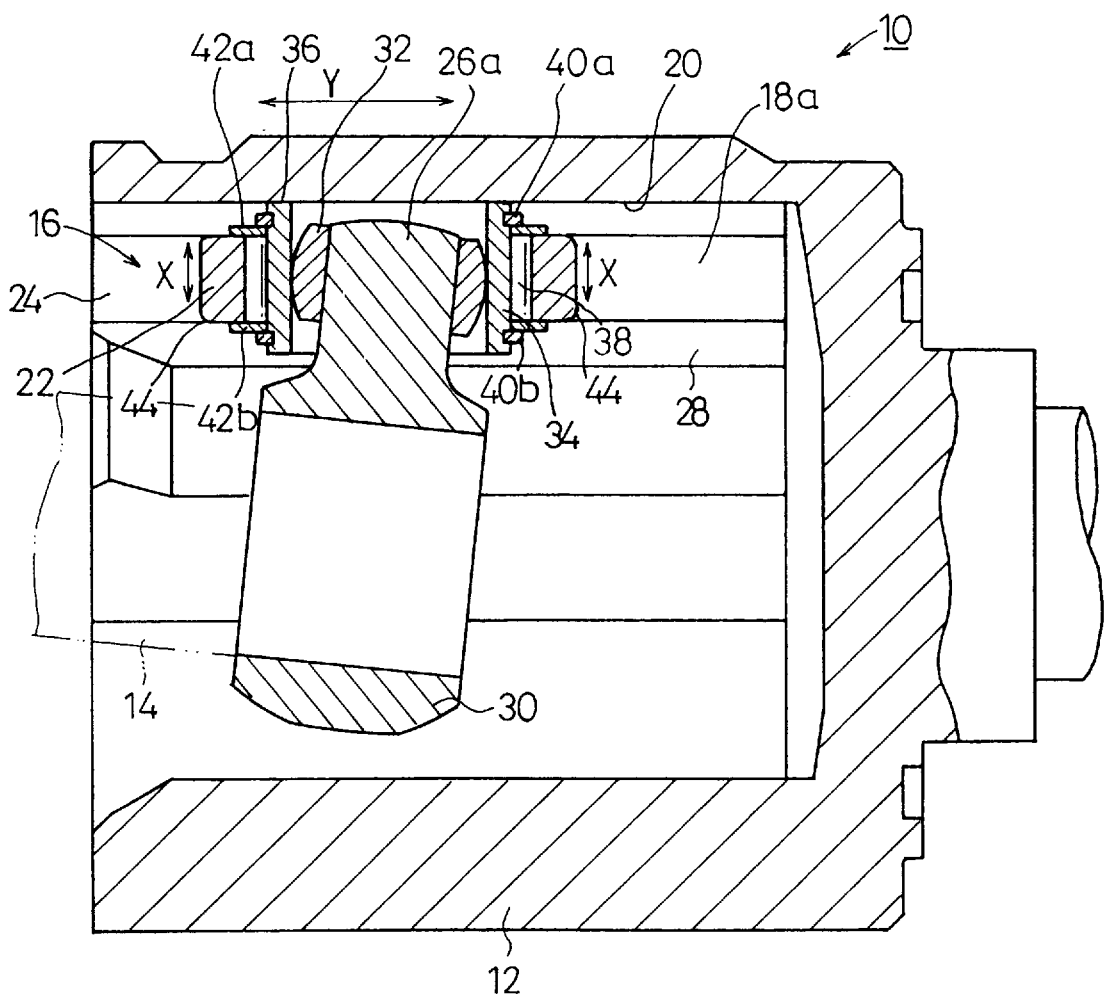
FIG. 5 illustrates the operation of the constant velocity universal joint shown in FIG. 2 in a state in which an outer roller is inclined at a predetermined angle.

In the present invention, if the outer roller 22 is inclined at a predetermined angle with respect to the guide groove 18a (18b, 18c) as shown in FIG. 5, the following functions are exerted. Namely, a first function which regulates the angle of inclination of the outer roller 22 by means of the upper end 36 of the holder 34 which abuts against the plane section 20 of the guide groove 18a (18b, 18c). A second function which regulates the angle of inclination of the outer roller 22 by means of frictional resistance generated when the outer roller 22 is slidably displaced vertically (in the direction indicated by the arrow X) along the guide groove 18a (18b, 18c). In addition, a regulates third function the angle of inclination of the outer roller 22 by means of the curved section 44 of the outer roller 22 which rolls along the expanded section 28 formed at the lower end of the guide groove 18a (18b, 18c) while making point-to-point contact are exerted respectively in a concerted manner. Thus the angle of inclination of the outer roller 22 with respect to the guide groove 18a (18b, 18c) is regulated.

As described above, the first to third functions are exerted on the outer roller 22 in the concerted manner. Thus the angle of inclination of the outer roller 22 with respect to the guide groove 18a (18b, 18c) can be regulated sufficiently and highly accurately.

As a result, the rotational motion provided on the side of the unillustrated driving shaft can be smoothly transmitted to the side of the driven shaft.

What is claimed is:

1. A constant velocity universal joint comprising:
   a cylindrical outer member coupled to one transmitting shaft and having, on an inner circumferential surface, a plurality of guide grooves spaced apart from each other by a predetermined spacing and extending along an axial direction, and an inner member comprising trunnions coupled to a second transmitting shaft and inserted into an opening inner space of said outer member, each of said guide grooves having a first plane section and a second plane section, said second plane section having a linear cross section substantially perpendicular to said first plane section;

outer rollers each having an outer circumferential surface having a linear cross section corresponding to said second plane section of said outer member, each of said outer rollers being displaceable along said second plane section in a direction substantially perpendicular to said axial direction;

holders for holding said outer rollers on said trunnions, each of said holders having an upper end capable of abutting against and being separated from said first plane section by displacement of said outer rollers;

expanded sections on the outer member formed adjacent to said second plane sections, each of said expanded sections having at lest one of a curved and flat configuration and protruding toward each of said trunnions; and curved sections having a curved configuration at one end in an axial direction of said outer roller, and making point-to-point contact with each of said expanded sections.

2. The constant velocity universal joint according to claim 1, wherein said outer roller is rollable and displaceable along an axial direction of said second plane section, and is slidably displaceable in a direction substantially perpendicular to said axial direction.

3. The constant velocity universal joint according to claim 1, wherein said expanded section and said curved section are formed to make contact at one point.

4. The constant velocity universal joint according to claim 3, wherein said expanded section and said curved section, which make said point-to-point contact with each other, are formed to have different radii of curvature respectively.

5. The constant velocity universal joint according to claim 3, wherein said expanded section has a flat configuration and said curved section has a curved configuration, which make said point-to-point contact with each other.

6. The constant velocity universal joint according to claim 1, wherein said outer roller is fastened to said holder by fastening members engaged with said holder, said fastening members comprising circlips fitted to said holder.

7. The constant velocity universal joint according to claim 6, wherein said fastening members comprise said circlips and washers fitted to said holder.

8. The constant velocity universal joint according to claim 1, wherein said trunnion has a columnar configuration, and an inner roller having a spherical surface is interposed between said trunnion and said holder for surrounding said trunnion.

9. The constant velocity universal joint according to claim 8, wherein said columnar trunnion and said inner roller having said spherical surface are integrated with each other to provide a spherical trunnion.

10. A constant velocity universal joint comprising:

a cylindrical outer member coupled to one transmitting shaft and having, on an inner circumferential surface, a plurality of guide grooves spaced apart from each other by a predetermined spacing and extending along an axial direction, and an inner member comprising trunnions coupled to a second transmitting shaft and inserted into an opening inner space of said outer member, each of said guide grooves having a first plane section and a second plane section, said second plane section having a linear cross section substantially perpendicular to said first plane section;

outer rollers each having an outer circumferential surface having a linear cross section corresponding to said second plane section of said outer member, each of said outer rollers being displaceable along said second plane section in a direction substantially perpendicular to said axial direction;

holders for holding said outer rollers on said trunnions, each of said holders having an upper end capable of abutting against and being separated from said first plane section by displacement of said outer rollers;

expanded sections on the outer member formed adjacent to said second plane sections, each of said expanded sections having at least one of a curved and flat configuration and protruding toward each of said trunnions; and curved sections each formed in a curved configuration at one end in an axial direction of said outer roller, and making point-to-point contact with each of said expanded sections;

wherein said outer roller is inclined at a predetermined angle with respect to said guide groove, a first function to regulate said angle of inclination of said outer roller by means of said upper end of said holder which abuts against said first plane section, a second function to regulate said angle of inclination of said outer roller by means of frictional resistance generated when said outer roller is slidably displaced in a direction substantially perpendicular to said axis of said guide groove, and a third function to regulate said angle of inclination of said outer roller by means of said curved section of said outer roller which rolls while making point-to-point contact along said expanded section at a lower end of said guide groove are exerted on said outer roller respectively; and said first to third functions are exerted in a concerted manner respectively for regulating said angle of inclination of said outer roller with respect to said guide groove.

* * * * *